United States Patent
Woerner et al.

(10) Patent No.: US 9,314,132 B2
(45) Date of Patent: Apr. 19, 2016

(54) COOKING RELEASE SHEET MATERIALS AND RELEASE SURFACES

(71) Applicant: SAINT-GOBAIN PERFORMANCE PLASTICS CORPORATION, Aurora, OH (US)

(72) Inventors: Graham A. Woerner, Bedford, NH (US); Timothy P. Pollock, Manchester, NH (US); Ephraim P. Lin, Bedford, NH (US); John M. Russo, Bartlett, IL (US); Anne B. Hardy, Acton, MA (US); Gerard T. Buss, Bedford, NH (US)

(73) Assignee: SAINT-GOBAIN PER.PLASTICS CORPORATION, Aurora, OH (US)

( * ) Notice: Subject to any disclaimer, the term of this patent is extended or adjusted under 35 U.S.C. 154(b) by 19 days.

(21) Appl. No.: 14/168,477

(22) Filed: Jan. 30, 2014

(65) Prior Publication Data

US 2014/0147568 A1   May 29, 2014

Related U.S. Application Data (63) Continuation of application No. 12/642,124, filed on Dec. 18, 2009, now Pat. No. 8,673,449.

(51) Int. Cl.
| | |
|---|---|
| *A47J 36/02* | (2006.01) |
| *A23L 1/01* | (2006.01) |
| *A23L 1/31* | (2006.01) |
| *C09D 127/18* | (2006.01) |
| *C03C 25/50* | (2006.01) |

(52) U.S. Cl.
CPC ............... *A47J 36/025* (2013.01); *A23L 1/01* (2013.01); *A23L 1/31* (2013.01); *C03C 25/50* (2013.01); *C09D 127/18* (2013.01); *Y10T 428/24479* (2015.01); *Y10T 428/24612* (2015.01); *Y10T 428/3154* (2015.04); *Y10T 428/31544* (2015.04)

(58) Field of Classification Search
None
See application file for complete search history.

(56) References Cited

U.S. PATENT DOCUMENTS

| | | |
|---|---|---|
| 4,123,401 A | 10/1978 | Berghmans et al. |
| 4,610,918 A | 9/1986 | Effenberger et al. |
| 4,654,235 A | 3/1987 | Effenberger et al. |
| 4,770,927 A | 9/1988 | Effenberger et al. |

(Continued)

FOREIGN PATENT DOCUMENTS

| | | |
|---|---|---|
| CN | 1565333 A | 1/2005 |
| CN | 101056568 A | 10/2007 |

(Continued)

OTHER PUBLICATIONS

NovaSmooth Fiberglass Fabric, Dielectric Solutions: the Fabric of Innovation, Dielectric Solutions, LLC, Teflon (registered branch of Dupont) date unknown, 1 page.

(Continued)

*Primary Examiner* — Callie Shosho
*Assistant Examiner* — Patrick English
(74) *Attorney, Agent, or Firm* — Abel Law Group, LLP; Chi Suk Kim (57) ABSTRACT

A cooking release material includes a layer comprising fluoropolymer. The cooking release material has a major surface having nucleation structures in a density of at least 10 per square inch. The cooking release material can include a reinforcement material, the layer coated over the reinforcement material. The cooking release material can include a second layer forming the major surface.

18 Claims, 7 Drawing Sheets

(56) References Cited

U.S. PATENT DOCUMENTS

| | | |
|---|---|---|
| 5,230,937 A | 7/1993 | Effenberger et al. |
| 5,434,001 A | 7/1995 | Yamada et al. |
| 5,508,084 A | 4/1996 | Reeves et al. |
| 5,693,244 A | 12/1997 | Pragt et al. |
| 5,931,083 A * | 8/1999 | Stanger et al. ............ 99/388 |
| 6,514,892 B1 | 2/2003 | Kasai et al. |
| 2002/0123282 A1 | 9/2002 | McCarthy et al. |
| 2003/0026951 A1* | 2/2003 | Okuyama ............ 428/156 |
| 2004/0242753 A1 | 12/2004 | Tomihashi et al. |
| 2006/0102013 A1 | 5/2006 | Spohn |
| 2007/0178133 A1 | 8/2007 | Rolland |
| 2007/0190336 A1 | 8/2007 | Patel et al. |
| 2009/0049996 A1 | 2/2009 | Calzada et al. |
| 2010/0159223 A1 | 6/2010 | Keese et al. |

FOREIGN PATENT DOCUMENTS

| | | |
|---|---|---|
| CN | 101245209 A | 8/2008 |
| EP | 0125955 A2 | 11/1984 |
| EP | 0164278 A1 | 12/1985 |
| EP | 1416024 A1 | 5/2004 |
| GB | 1557230 A | 12/1979 |
| JP | S59-005225 B2 | 2/1984 |
| JP | H04-009141 B2 | 2/1992 |
| JP | H04-371116 A | 12/1992 |
| JP | H05-039451 A | 2/1993 |
| JP | H05-123246 A | 5/1993 |
| JP | H05-059827 B2 | 9/1993 |
| JP | H07-011581 A | 1/1995 |
| JP | H0866314 A | 3/1996 |
| JP | H09507153 A | 7/1997 |
| JP | H107973 A | 1/1998 |
| JP | H10-316820 A | 12/1998 |
| JP | 2004-033393 A | 2/2004 |
| JP | 2005-087526 A | 4/2005 |
| JP | 2009-131537 A | 6/2009 |
| JP | 2012-511454 A | 5/2012 |
| WO | 03006565 A | 1/2003 |
| WO | 03/011991 A1 | 2/2003 |
| WO | 2010075210 A2 | 7/2010 |

OTHER PUBLICATIONS

The Extended European Search Report for EP Application No./ Patent No. 10838316.7-1301 / 2512307, PCT/2010061119, received form the European Patent Office, dated Apr. 18, 2013, 7 pages.

Pieter Van Der Wal et al., "Super-hydrophobic surfaces made from Teflon," They Royal Society of Chemistry, 2007, Soft Matter, R S C Publications, GB, vol. 3, dated Jan. 1, 2007, pp. 426-429.

Steiner et al., Super-hydrophobic surfaces made from Teflon, Soft Matter, Dec. 12, 2006, vol. 3, pp. 426-429.

Taconic, Taconic TFE-Glass Fabric, 2005, pp. 1-3, http://www.4taconic.com/en/tfe--glass.php.

International Search Report from PCT Application No. PCT/US2010/061119, 1 page.

* cited by examiner

COOKING RELEASE SHEET MATERIALS AND RELEASE SURFACES

CROSS-REFERENCE TO RELATED APPLICATION

This application claims priority under 35 U.S.C. §120 and is a continuation of U.S. patent application Ser. No. 12/642,124 entitled "COOKING RELEASE SHEET MATERIALS AND RELEASE SURFACES," by Graham A. Woerner et al., filed Dec. 18, 2009, now U.S. Pat No 8,673,449, which is assigned to the current assignee hereof and incorporated herein by reference in its entirety.

FIELD OF THE DISCLOSURE

This disclosure relates to cooking release sheets and methods of forming cooking release sheets.

BACKGROUND

In the food industry, particular in relation to commercially prepackaged and prepared foods or restaurants, businesses are turning to faster methods of cooking food in a uniform manner. In addition, such businesses are seeking to streamline operations including cleanup operations and are seeking to reduce the risk of employee injury. However, particular cooking processes and particular food products pose problems associated with grease splatter or aggressive boiling.

For example, meat products produce a combination of grease and water when cooked, leading to grease splatter. Such splatter can increase efforts to maintain a clean system. Grease splatter build-up can lead to fires and sanitation issues. Also, splatter of hot grease can pose a danger to employees.

In an example, commercially prepackaged food products or commercially precooked foods can be cooked on a cooking belt. In another example, meat can be cooked on a flat surface (i.e., standard stove configuration) with heat only from below. The release sheet prevents sticking of the meat or meat juices to the cooking surface. Reduced sticking results in reduced effort used to scrape meat off the surface. The reduced sticking also reduces burnt residue that is to be scraped off the cooking surface so that subsequent meat to be cooked will not stick.

In another example, meat can be cooked on a two-sided grill, which supplies heat from both the top and bottom. Absent a non-stick surface on the belt or grill, meat products can stick to surfaces or be ripped into two pieces when a grill is opened. Accordingly, industry has turned to non-stick cooking surfaces.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Low surface energy materials provide non-stick surfaces that limit adhesion of food. When food, such as a meat product, is heated, it often releases both grease and water. Applicants discovered that when both water and grease are disposed on a grill or grill sheet surface, particularly a surface formed of a low surface energy material, the water can be coated by the grease and can superheat. When a portion of the water flashes to steam, hot grease and water are projected from the surface as splatter. Such splatter causes dispersion of grease on other surfaces, making cleaning more difficult. Moreover, such splatter can be particularly harmful when it contacts skin or eyes.

Superheating can also arise from boiling water and other liquid substances, particularly on low surface energy surfaces or in microwave ovens. A disturbance can lead to a sudden phase change, causing hot liquid to be projected from a container.

In a particular embodiment, a sheet material includes a low surface energy polymer, such as a fluoropolymer and includes a major surface having nucleation structures. Such a sheet material can be in the form of a grill sheet, a cooking belt, a film, a coating, or a combination thereof. In an embodiment, a sheet material particularly suitable as a grill sheet includes a reinforcement material and a perfluoropolymer coating. The sheet material has a major surface comprising nucleation structures, such as a voids or fractures, at a density of at least 10 nucleation structures per square inch. It is believed that nucleation structures promote evaporation or initiate small bubbles, leading to boiling with smaller bubbles. In particular, the nucleation structures have a characteristic dimension, described in more detail below, of not greater than 50 micrometers. In addition, the sheet material can include a fluoropolymer coating disposed between the major surface of the sheet material and the reinforcement material.

Figure 1:
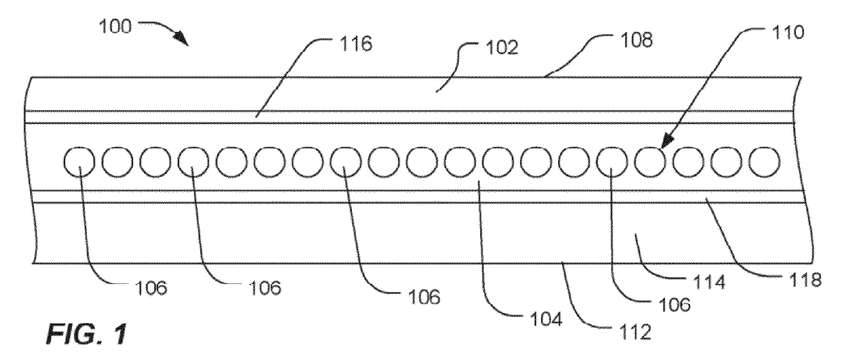
FIG. 1 includes an illustration of a cross-section of an exemplary sheet material.

In the embodiment illustrated in FIG. 1, a sheet material 100, such as a cooking sheet, includes a reinforcement material 110 coated with a fluoropolymer coating layer 104. A topcoat 102 can be disposed on or can overlie the fluoropolymer coating layer 104, and an undercoat 114 can be disposed under or can underlie the fluoropolymer coating layer 104. As described herein, the terms "over" or "overlie" are used to describe locations relatively closer to a cooking surface or the surface intended to contact an item, such as food, to be heated. The terms "under" or "underlie" describe locations relatively further from the cooking surface. As illustrated, the topcoat 102 forms a cooking surface 108. Absent the topcoat 102, the fluoropolymer coating layer 104 can form the cooking surface 108. In addition, the undercoat 114 forms a grill contact surface 112 to contact a grill. Absent the undercoat 114, the fluoropolymer coating layer 104 can form the grill contact surface 112. Optionally, an intermediate layer 116 can be disposed between the fluoropolymer coating layer 104 and the topcoat 102, and an intermediate layer 118 can be disposed between the fluoropolymer coating layer 104 and the undercoat 114.

The reinforcement material 110 can include a fibrous reinforcement, such as a woven or nonwoven fibrous reinforcement. For example, the fibrous reinforcement can be a woven fabric or an intermeshing of randomly oriented fibrous strands. In one exemplary embodiment, the fabric is a woven glass fabric. In another exemplary embodiment, the fabric is a knitted fabric. In other embodiments, the reinforcement can include a mesh of ceramic, plastic, or metallic material or sheets of composite materials, among others. Alternatively, the reinforcement material 110 can take the form of a substrate, typically a sheet. Embodiments can use supports formed of high melting point thermoplastics, such as thermoplastic polyimides, polyether-ether ketones, polyaryl ketones, polyphenylene sulfide, and polyetherimides; thermosetting plastics, particularly of the high temperature capable thermosetting resins, such as polyimides; coated or laminated textiles based on the above thermoplastics or similar thermally stable resins and thermally stable reinforcements such as fiberglass, graphite, and polyaramid; plastic coated metal foil; and metallized or metal foil laminated plastic films. In addition, exemplary embodiments include woven and non-woven materials formed of fibers selected from aramid such as Kevlar® or Nomex®, fluorinated polymer, fiberglass, graphite, polyimide, polyphenylene sulfide, polyketones, polyesters, or a combination thereof. In particular, the fibrous reinforcement includes a fiberglass reinforcement that has been cleaned or pretreated with heat. Alternatively, the fibrous reinforcement can be a coated fiberglass reinforcement. In a particular example, each of the fibers of the fiberglass can be individually sized with a polymeric coating.

In a particular example, the reinforcement material 110 includes a fabric. The fabric includes a plurality of yarns 106. In an example, the yarns 106 are interwoven together to form the fabric. While the yarns 106 are illustrated in FIG. 1 to be uniformly distributed, the yarns 106 can be bunched together.

In a particular embodiment, each filament of the yarn 106 can be pretreated prior to incorporation into the yarn 106 or into the fabric. For example, each filament can be coated with a size coat. In a particular example, the size coat includes a silane or other hydrophobic or oleophobic chemical that improves a bond with fluoropolymers, such as a perfluoropolymer.

In a particular embodiment, the fabric has a weight in a range of 0.7 osy to 2.4 osy, such as a weight of 0.8 osy to 1.5 osy, or even a weight of 1.0 osy to 1.5 osy. The fabric can have yarns in a range of 20 to 80 yarns per inch, such as 30 to 70 yarns per inch or even 40 to 65 yarns per inch in the warp or fill directions. Further, the fabric can have a thickness in a range between 1.0 mil and 3.0 mils, such as a range of 1.0 mils to 2.3 mils, or in particular, in a range of 1.5 mils to 2.3 mils.

As illustrated, the reinforcement material 110 is incorporated within the fluoropolymer coating layer 104. Alternatively, the fluoropolymer coating layer 104 can be disposed on either side of the reinforcement material 110. In particular, the reinforcement material 110 can reside closer to the grill surface 112.

In an embodiment, the fluoropolymer coating layer 104 includes a fluoropolymer. An exemplary fluoropolymer can be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes polytetrafluoroethylene (PTFE), a fluorinated ethylene propylene copolymer (FEP), a copolymer of tetrafluoroethylene and perfluoropropyl vinyl ether (perfluoroalkoxy or PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. In an example, the fluoropolymer includes polytetrafluoroethylene (PTFE), fluorinated ethylene propylene (FEP), perfluoroalkoxy (PFA), polyvinylidene fluoride (PVDF), or any combination thereof. In particular, the fluoropolymer can include polytetrafluoroethylene (PTFE), fluorinated ethylene propylene (FEP), perfluoroalkoxy (PFA), or any combination thereof. In a further embodiment, the fluoropolymer can be a perfluoropolymer, such as PTFE or FEP.

In a particular example, the fluoropolymer includes a perfluoropolymer. For example, the perfluoropolymer can include polytetrafluoroethylene (PTFE), fluorinated ethylene propylene (FEP), perfluoroalkoxy (PFA), or any blend or copolymer thereof. In a particular example, the fluoropolymer coating layer 104 includes polytetrafluoroethylene (PTFE).

Optionally, a topcoat 102 can be formed on top of or can overlie the fluoropolymer coating layer 104. In an example, the topcoat 102 includes a fluoropolymer, such as a perfluoropolymer. For example, the topcoat 102 can include PTFE. In another example, the topcoat 102 includes a thermoplastic processible fluoropolymer. For example, the topcoat 102 can include a perfluoroalkoxy (PFA), fluorinated ethylene propylene (FEP), or a blend or copolymer thereof.

In a further example, the topcoat 102 can include a blend of perfluoropolymer and a second polymer. In an example, the second polymer can include a silicone. The silicone polymer can include a polysiloxane. For example, the silicone polymer can include a polyalkylsiloxane, a phenylsilicone, a fluorosilicone, or any combination thereof. In an example, a polyalkysiloxane includes a polydimethylsiloxane, a polydipropylsiloxane, a polymethylpropylsiloxane, or any combination thereof. In particular, the silicone polymer can be derived from an aqueous dispersion of precured silicone polymers. In an example, the silicone polymer can be derived from an aqueous dispersion and can include precured silicone. In particular, the silicone polymer can be derived from an aqueous dispersion of precured silicone with terminal groups or additives, such as cross-linkers. For example, the silicone polymer can be selected from a silicone polymer dispersion available from Wacker-Chemie GmbH, Munchen, Germany, such as the Wacker CT27E silicone rubber dispersion, or available from Dow Corning, such as DC2-1266 silicone rubber. In particular, the silicone is formulated such that it can be used in contact with food or in medical applications, herein referred to as "at least food grade." Further, the sheet material can be at least food grade, being formed of materials that can be used in contact with food, such as permitted by the United States of America Food and Drug Administration.

The blend can include silicone polymer in an amount in a range of 0 wt % to 80 wt % based on the total weight of the solids of the blend, such as a range of 0 wt % to 40 wt %. For example, the blend can include silicone polymer in an amount in a range of 2 wt % to 30 wt %, such as a range of 5 wt % to 30 wt %, a range of 10 wt % to 30 wt %, or even a range of 15 wt % to 20 wt %. In addition, the blend can include fluoropolymer, such as perfluoropolymer, in an amount in a range of 60 wt % to 100 wt %, such as a range of 75 wt % to 90 wt %, or even a range of 80 wt % to 85 wt %.

Similarly, the undercoat 114 can be formed under or can underlie the fluoropolymer coating layer 104. In an example, the undercoat 114 includes a fluoropolymer, such as a perfluoropolymer, such as PTFE. In a particular example, the undercoat 114 includes a thermoplastic processible fluoropolymer. For example, the undercoat 114 can include a perfluoroalkoxy (PFA), fluorinated ethylene propylene (FEP), or a combination thereof.

In an example, the undercoat 114 and topcoat 102 form symmetric layers on either side of the fluoropolymer coating layer 104. Alternatively, the undercoat 114 and the topcoat 102 form asymmetric layers about the fluoropolymer coating layer 104. In a further example, the sheet material 100 can include one or the other, or both of the topcoat 102 and the undercoat 114.

Optionally, the intermediate layer 116 can be formed to overlie the fluoropolymer coating layer 104, and intermediate layer 118 can be formed to underlie the fluoropolymer coating layer 104. In an example, the intermediate layers 116 or 118 can be formed of a fluoropolymer. The fluoropolymer can be different from the fluoropolymer of the fluoropolymer coating layer 104. In an example, the fluoropolymer of the intermediate layer 116 or 118 can be a meltable fluoropolymer. In another example, the fluoropolymer of the intermediate layer 116 or 118 can be a castable fluoropolymer.

Figure 2:
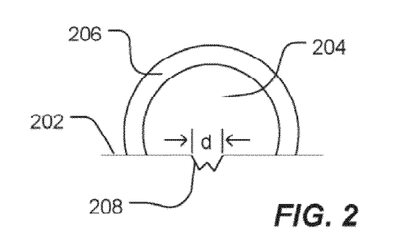
FIG. 2 includes an illustration of a droplet of grease and water on an exemplary surface during use.

In particular, the sheet material 100 includes a major surface 108 that has nucleation structures (not illustrated). A nucleation structure defines at least one nucleation point where evaporation can initiate. As illustrated in FIG. 2, nucleation structures 208 are disposed in proximity to the major surface 202 of a sheet material. The nucleation structures 208 have a characteristic dimension "d", defined as the average of the smallest dimension of the nucleation structure parallel to a plane defined by the sheet material. In a particular example, the characteristic dimension (d) of the nucleation structures 208 is not greater than 100 micrometers, such as not greater than 50 micrometers, not greater than 15 micrometers, not greater than 5 micrometers, or even not greater than 1 micrometer.

In particular, the nucleation structure 208 can be a recess or a surface of a protrusion where evaporation can initiate. As illustrated in FIG. 2, water 204 surrounded by grease 206 can form on a cooking surface. It is believed that water molecules with energy to convert to steam can congregate at nucleation points of nucleation structures 208 and form bubbles of steam. When the bubbles are large enough they separate from the nucleation point and rise to the surface. A large number of nucleation points can result in a large number of small bubbles, each with insufficient energy when popping to propel water or grease far. The nucleation points thus limit superheating of the water 204 and limit flashing of the water, limiting splatter.

Figure 3:
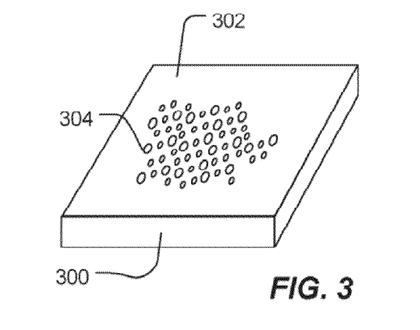
FIG. 3 and FIG. 4 include illustrations of exemplary nucleation structures.
Figure 4:
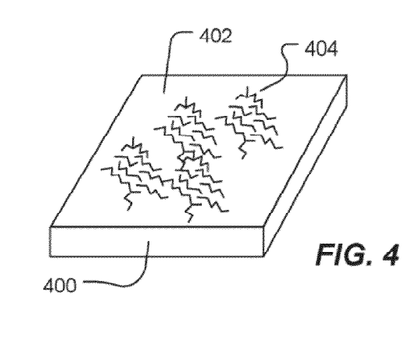

FIG. 3 and FIG. 4 illustrate exemplary nucleation structures. As illustrated in the FIG. 3, nucleation structures can be voids 304 formed in a surface 302 of a sheet material 300. In a further example illustrated in FIG. 4, the nucleation structures can be cracks or fissures 404 in the surface 402 of the sheet material 400. Further, combinations of one or more of the above nucleation structures can be formed in a surface of a sheet material.

Returning to FIG. 1, a major surface of the sheet material 100, such as the cooking surface 108 can include nucleation structures, such as voids. In an example, the voids can result from the composition of the topcoat 102 or can result from the removal of fugitive components when forming the topcoat 102. For example, the topcoat 102 can be formed of a blend of perfluoropolymer and silicone, such as a blend of PTFE and at least food grade silicone. An exemplary blend is described above. Such blends, when sintered to form a topcoat 102, can manifest voids on the surface 108 of the sheet material 100.

In another example, voids in the cooking surface 108 can result from fugitive components in a composition forming the topcoat 102. Such fugitive components are removed to leave voids in the cooking surface 108 of the sheet material. The fugitive component can be removed as part of the sintering process through burn-out or can be removed following the sintering process, such as through washing or dissolution in a solvent bath. In an example, the fugitive component is a burn-out component having an evaporation or oxidation temperature less than the sintering temperature of the topcoat 102. An exemplary burn-out component includes a polymeric material or a natural material, or any combination thereof. For example, the polymeric burn-out component can include acrylic polymer such as polymethyl methacrylate (PMMA), polyamide, polyolefin, polyester, modified-cellulosic polymers, or any combination thereof. In an example, the natural material can include activated carbon, paper particles, saw dust, pepper, sugar, food starch, or any combination thereof.

In another example, the fugitive component is removed following the sintering process. For example, the fugitive component can be removed through washing or dissolution. In an example, the fugitive component includes an acid soluble salt. In such an example, the fugitive component can be removed by exposing the sheet material 100 to an acid bath or another solvent following sintering.

In an additional embodiment, the topcoat 102 can be formed through spray-coating. The sprayed coating could contain particles that are fugitive following some post treatment, such as a) heating, b) solvent washing, c) might contain particles that form raised nucleation sites, d) might be sufficiently thick that fissures form on drying and fusing, or any combination thereof.

In another embodiment, the nucleation structures can include protrusions extending from the surface 108 of the sheet material 100. For example, the topcoat 102 can include an inclusion agent, such as a particulate material. In an example, the inclusion agent can include glass beads, silica, alumina, aluminosilicate material, calcium carbonate, calcium sulfate, another inert ceramic material, or any combination thereof.

In another example, voids can be formed through embossing or stamping. The sheet material 100 can be embossed prior to sintering. Alternatively, the sheet material 100 can be embossed following sintering. In an example, a negative of the desired pattern can be formed on a roller or on a press. The pattern can be pressed into the sheet material 100. In an example, the pattern includes voids. Alternatively, a paper having embedded protruding particles can be pressed into the sheet material to stamp or emboss nucleation structures into the cooking surface 108.

In an alternative example, hard particles can be dispersed over the cooking surface 108, pressed into the cooking surface, and subsequently, removed to leave voids. For example, salt particles can be pressed into the topcoat 102 and subsequently washed away.

In a particular embodiment, the nucleation structures can include cracks or fractures. When thick layers of perfluoropolymer materials are applied in a single pass, the layers tend to crack or fissure. In an example, a PTFE coating is applied in a single pass to form a coating having a thickness greater than 0.35 mils, such as at least 0.4 mils, at least 0.5 mils, or even at least 0.6 mils. In another example Teflon® PFA or Teflon® FEP dispersion coating applied at 0.2 mils can crack or fissure.

The cooking surface 108 of the sheet material can include nucleation structures in a nucleation structure density of at least 10 nucleation structures per square inch. The nucleation structure density of nucleation structures can be determined by visually counting the number of nucleation structures in an area, of approximately 500 to 1000 square mils (a mil=a thousandth of an inch) and dividing by the area expressed in inches. In an example, the cooking surface 108 includes nucleation structures at a nucleation structure density of at least 100 per square inch, such as at least 500 per square inch, at least 1000 per square inch, at least 5000 per square inch, at least 10000 per square, at least 25000 per square inch, or even at least 50000 per square inch.

The sheet material 100 can exhibit desirable features. In particular, the sheet material 100 has a thickness of not greater than 5.0 mils, such as not greater than 4.0 mils, or even not greater than 3.2 mils. For example, the thickness can be not greater than 3.0 mils, such as not greater than 2.8 mils, or even not greater that 2.4 mils.

In addition, the sheet material 100 exhibits desirable mechanical properties. For example, the sheet material 100 can have a desirable tensile strength in both the warp and fill directions. In addition, the sheet material 100 can have a desirable trapezoidal tear strength. Moreover, the sheet material 100 can retain desirable mechanical properties after distress. For example, the sheet material 100 can exhibit a desirable crease tensile strength and crease trapezoidal tear strength. In addition, the sheet material 100 can exhibit a desirable MIT flex performance.

In a particular embodiment, tensile strength can be measured using ASTM D902. The sheet material 100 can have a tensile strength in the warp direction of at least 30 lbs, such as at least 50 lbs. In particular, especially in the context of a belt, the sheet material can have a tensile strength in the warp direction of at least 325 lbs, such as at least 450 lbs. In a further example, the tensile strength in the fill direction can be at least 45 lbs, such as at least 65 lbs, or even at least 70 lbs. In particular, especially in the context of a belt, the belt material can have a tensile strength in the fill direction can be at least 150 lbs, such as at least 300 lbs, or even at least 400 lbs.

The sheet material 100 can have a desirable trapezoidal tear strength as measured in accordance with ASTM D751, as modified by ASTM D4969. For example, the trapezoidal tear strength of the cooking sheet 100 can be at least 3.5 lbs, such as at least 4.0 lbs. Particularly in the context of a belt, the belt material can have a desirable trapezoidal tear strength of at least 5.5 lbs, such as at least 7.5 lbs, or even at least 12 lbs.

In addition, the sheet material 100 can exhibit desirable tensile strength and trapezoidal tear strength after distress, such as creasing. In particular, the tensile strength and trapezoidal tear strength can be measured after creasing one time with a 10 lb roller applied parallel to a fold. The tensile strength of the material after creasing with the 10 lb roller is denoted as the crease tensile strength, and the trapezoidal tear strength after creasing is denoted the crease trapezoidal tear strength. In particular, the sheet material 100 can have a crease tensile strength in the warp direction of at least 10 lbs, such as at least 15 lbs, or even at least 17 lbs. Further, the sheet material 100 can exhibit a crease trapezoidal tear strength of at least 0.5 lbs, such as at least 1.0 lbs.

The durability of the sheet material 100 under distress can also be characterized by the MIT flex performance. For example, the sheet material 100 can have a MIT flex performance of at least 10,000, such as at least 15,000, at least 20,000, or even at least 25,000. The MIT flex performance is measured with repetitions at 2 pounds on a ½ inch wide specimen in accordance with the folding endurance test of ASTM D2176-63J.

In a further example, the sheet material 100 exhibits low permeability. In particular, the sheet material 100 is not porous or layers that can be porous, such as a layer comprising the perfluoropolymer/silicone blend, include pores that are not substantially interconnected or are localized to that layer. For example, the sheet material 100 can have a permeability of not greater than 0.001 cu. in/min, as measured in accordance with ASTM D737, such as having a permeability of approximately 0 cu, in/min within the sensitivity of the measuring device. As such, the sheet material 100 can be impermeable. In a particular example, a sheet material 100 including a reinforcement layer and a layer comprising the fluoropolymer has a permeability of not greater than 0.001 cu. in/min.

Further, the sheet material 100 performs well when tested for cooking performance. In particular, the sheet material 100 is resistant to wicking of grease and charring of grease. In an example, wicking is tested by subjecting the sheet to hot grease for greater than 16 hours, typically 1 week, at 400° F. When grease wicks into the fabric or cooking sheet, it tends to char and weaken the fabric. In addition, it tends to discolor both the fabric and the individual filaments. Embodiments of the sheet material 100 described above exhibit little or no wicking, little or no charring of grease, and little or no discoloration of the filaments or the fabric. Thus, embodiments of the sheet material 100 receive a pass rating for the wicking rating.

In a further example, the sheet material performs well when subjected to the Grease Bake Test. The sheet material is layered together with hamburger grease, wrapped in aluminum foil, and baked in an oven at 400° F. for a week. A desirable sheet material maintains structural integrity and exhibits limited wicking and charring in the yarns following the test.

Splatter is tested using two methods. The first method measures the amount of grease projected at least 4 inches from the cooking surface. The second method estimates the approximate height of splatter projected from the surface. In the first method, a sheet material is placed on a grill surface. Paper is placed 4 inches above the grill surface, where meat patties are cooked. The tests are performed with meat patties weighing approximately 115 grams. Scoring is performed by visually comparing the overall grease collected relative to standards and averaging the results of 3 iterations. In the scoring the sheets are graded from 0 to 5 relative to a set of standards per height. As scored, zero means no splatter, 1=very little splatter and not enough to hurt anyone; 2=slight splatter; and at 5 the splatter is low, yet unlikely to hit someone beyond the hands.

In the second method, splattering is observed on the primary grill at a restaurant after a two-sided grill opens by visually observing the splatters and estimating the number and height of the splatter. Two sets of meat patties are evaluated for the test.

Figure 5:
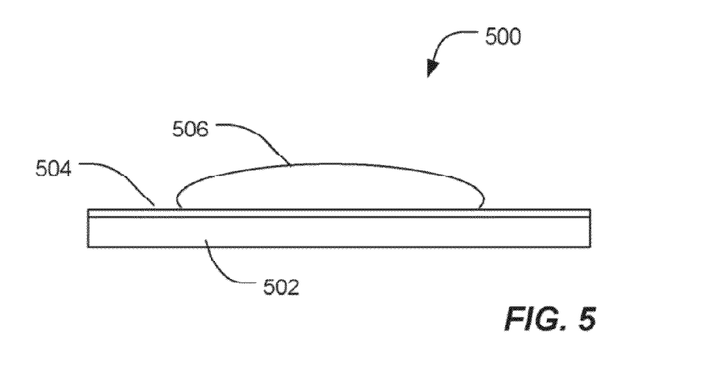
FIG. 5 includes an illustration of an exemplary flat grill with a cooking sheet.

In a particular embodiment, the cooking sheets can be applied to a surface of a grill. For example, a flat grill 500 can include a platen 502 to be heated. On a cooking surface of the platen 502, a grill sheet 504 is disposed. The grill sheet 504 has a surface in contact with the platen 502 and has an opposite surface that includes nucleation structures, as described above. In an example, a food product 506 can be placed over the grill sheet 504 and cooked using the heat from the platen 502.

Figure 6:
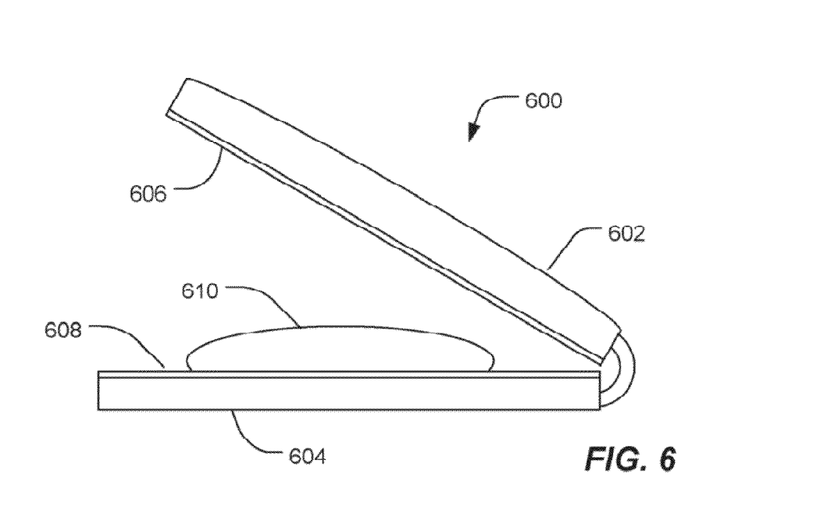
FIG. 6 includes an illustration of an exemplary two-sided grill.

For example, the grill can be a two-sided grill 600, as illustrated in FIG. 6. In an example, the grill includes a top platen 602 and a lower platen 604. The grill platens (602, 604) are heated. A food article 610 is disposed between the grill platens (602, 604) and the grill platens (602, 604) are closed around the food article 610 to cook it.

A cooking sheet 608 can be disposed between the food article 610 and the bottom grill platen 604 or release sheet 606 can be disposed between the food article 610 and the top grill platen 602. In particular, the cooking sheets 608 or 606 can be mechanically coupled to the bottom platen 604 or the top platen 602, respectively.

A cooking sheet 608 can be applied over the lower platen 604. In an example, the cooking sheet 608 can be mechanically coupled to the lower platen 604. Alternatively, the cooking sheet 608 can be adhered to the lower platen 604.

In practice, the cooking sheets (606, 608) are applied to their respective platens (602, 604) and the platens (602, 604) are heated. A food article 610 is placed between the platens on top of the cooking sheet 608 and under the cooking sheet 606 and the platens (602, 604) are brought together to heat the respective top and bottom surfaces of the food article 610 under pressure. Once cooked, the two-sided grill is opened, separating the top platen 602 from the lower platen 604. The food article is removed, leaving the cooking sheets 606 and 608 in place.

Figure 7:
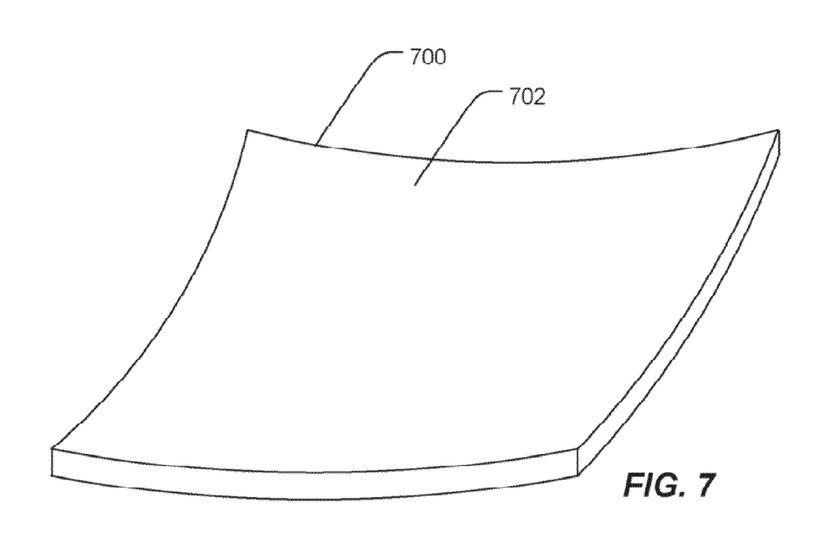
FIG. 7 includes an illustration of an exemplary cooking film.

In an alternative embodiment, the sheet material can be a film formed without reinforcement, as illustrated in FIG. 7. For example, a film 700 can be formed having nucleation structures on a surface 702, such as a cooking surface. The surface 702 of the film 700 can have the nucleation structures in a nucleation structure density of at least 10 per square inch or in a nucleation structure density as described above. The nucleation structures can be voids or cracks and can be formed as described above.

In an example, the film 700 is a single layer construction. In another example, the film 700 is a multilayer construction formed as described above absent the reinforcement layer. The film 700 can be used as a releasable stand alone film. Alternatively, the film 700 can be laminated to a substrate or laminated to another sheet material. In particular, the film 700 can be placed on or laminated to a substrate that is to be heated.

Figure 8:
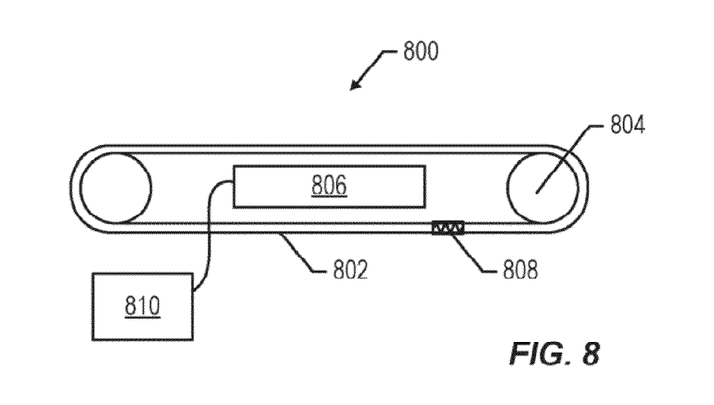
FIG. 8 and FIG. 9 include illustrations of exemplary cooking belt systems.

In a further embodiment, the sheet material forms a cooking belt. As illustrated in FIG. 8, a system 800 includes a belt 802 and a heat source 806. The belt 802 includes a flexible support coated with a fluoropolymer. The outer surface of the cooking belt has nucleation structures, for example, in a nucleation structure density of at least 10 nucleation structures per square inch. A control unit 810 can be used to influence the amount of heat that is provided by the heat source 806. In a particular example, the belt material 100 has a thickness of not greater than 8 mils, such as not greater than 14 mils, or even not greater than 20 mils.

As shown in the particular embodiment, the belt 802 forms a closed loop belt. The closed loop belt is wrapped around rollers 804. Typically, the heating belt is flexible to allow routing around the rollers 804 and continual rotational movement around the rollers 804. The coated flexible support can constitute a portion of the belt 802 or substantially the entirety of the belt 802. The belt 802 can include other portions such as a lacing or clasp mechanism 808.

In addition, the belt 802 exhibits desirable mechanical properties, as described above. For example, the belt 802 can have a desirable tensile strength in both the warp and fill directions. In addition, the belt 802 can have a desirable trapezoidal tear strength. Moreover, the belt 802 can retain desirable mechanical properties after distress. For example, the belt 802 can exhibit a desirable crease tensile strength and crease trapezoidal tear strength. In addition, the belt 802 can exhibit a desirable MIT flex performance.

Figure 9:
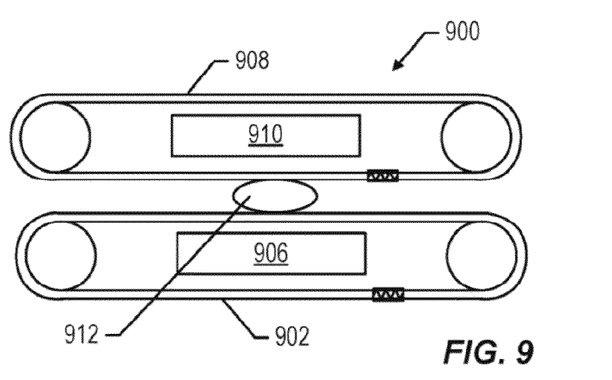

In a further example, the sheet material can be used in a two belt system, such as the system 900 illustrated in FIG. 9. For example, the sheet material can used to form a belt 902 or a belt 908. The outer surfaces of at least the belt 902 and optionally, the belt 908 have nucleation structures. Each belt (902 or 908) can be heated by respective heat sources (906 or 910). In a particular example, a food product 912 can be placed between the belts (902 or 908) and cooked. In general, the belts (902 or 908) travel at the same speed to avoid causing shear in the food product 912. Depending on the nature and positioning of the heat sources (906 or 910), the food product 912 can be cooked on both sides simultaneously.

The sheet material can be formed by a method that includes dispensing a fabric. In an example, the fabric is a fiberglass fabric that includes filaments that are individually size coated. The fabric can be dip coated into a dispersion including a fluoropolymer, such as a perfluoropolymer. Excess dispersion can be metered from the fabric and the fluoropolymer dispersion can be heated to drive off solvents and surfactants and to consolidate the fluoropolymer. The coating process can be performed one or more times, such as at least two times, at least three times, or even at least four times. A topcoat can be applied over one or both surfaces of the coated fabric. For example, the coated fabric can be dip coated to include a different fluoropolymer. Alternatively, a fluoropolymer film can be laminated to the coated fabric or a layer can be extruded onto one or more surfaces of the coated fabric. As part of the topcoat application process or following application of the topcoat, nucleation structures can be formed on the surface of the sheet material.

In a particular example, the sheet material is formed through a process of coating a carrier web or a reinforcement material (e.g., the fabric) with a low surface energy, low coefficient of friction material, such as fluoropolymer, for example, a perfluoropolymer. In an example, the perfluoropolymer includes PTFE. The carrier web or the reinforcement material are paid from a roll and coated on at least one side with a suspension including fluorinated polymer particles dispersed in a liquid medium. In one particular embodiment, the suspension includes PTFE aqueous dispersion to which surfactant has been added. Alternatively, the suspension can be free of surfactant.

A blade or metering rod is positioned to remove excess suspension from the carrier web. The suspension is then dried and sintered to form a layer on the carrier web. In a particular embodiment, the coated suspension is dried at a temperature in a range of about 150° F. to about 300° F. and sintered at a temperature in a range of about 550° F. to about 720° F. Optionally, surfactants can be driven off the coating prior to sintering by heating at a temperature in a range of about 500° F. to about 600° F. The thickness of the layer can be increased by repeating the coating process. In one exemplary embodiment, the carrier web can be coated with the suspension, the suspension dried, and a second coating applied to the dried suspension before sintering.

In exemplary embodiments, the thickness of the fluorinated polymer coating is generally about 0.2-12 mils. For example, the thickness can be about 0.2-4 mils, such as about 0.5-3 mils. The second layer can have a thickness of about 0.1 mils to about 5 mils, such as about 0.1 mils to 3 mils, or even about 0.1 mils to 1 mil.

Optionally, a second layer of fluoropolymer can be applied over the first layer. For example, the second layer can include a second fluoropolymer. Application of the second fluoropolymer can be performed using a dip coating method, similar to the method described above. Alternatively, the second layer can be applied by extruding a layer over the first layer. In another example, a second layer can be laminated to first layer, such as through heat lamination.

A topcoat is applied over the first layer or the optional second layer. For example, the topcoat can be applied using the dip coating method, similar to the method described above. Alternatively, a cooking surface can be formed by laminating an outer layer to the first layer or the optional second layer. In a further example, the topcoat can be applied by spray-coating. As part of the application process or following the application of the topcoat, nucleation structures can be formed in the topcoat.

For example, to form voids, the topcoat can be formed of a blend of fluoropolymer and at least food grade silicone. In particular, the blend can include a perfluoropolymer and can include a silicone resin in an amount of 0 wt % to 80 wt %, such as 2 wt % to 40 wt %, based on the solids content of the dispersion. The sheet material can be dip coated into the dispersion and the dispersion sintered as described above. The resulting topcoat exhibits voids along the surface, which act as nucleation structures.

In another example, voids can be formed by coating with a dispersion that includes a fugitive component, such as those fugitive components described above. For example, the dispersion can include a fugitive polymer, such as polymethyl methacrylate (PMMA), polyethylene, polypropylene, or any combination thereof. During sintering, the fugitive component can escape from the coating, leaving voids. Alternatively, the dispersion can include fugitive components, such as particulate materials, that can be removed following sintering, such as through washing or dissolution.

In a further example, nucleation structures can include protrusions extending from the cooking surface. For example, the dispersion can include solid particulate. When the dispersion is coated over the sheet material and sintered the consolidation of the dispersion leaves protrusions extending from the surface.

To form cracks or fissures, the topcoat can be applied at a thickness of at least 0.35 mils, such as at least 0.4 mils, resulting from a single pass through the dispersion. For example, the thickness can be in a range of 0.4 mils to 0.8 mils. In particular, metering bars can be set to provide a layer of PTFE dispersion that results in cracks or fissures during drying and sintering. In another example, a cracked or fissured layer of Teflon® FEP or Teflon® PFA can be formed at a layer of thickness at least 0.2 mils, such as at least 0.3 mils.

In another example, indentations can be formed by embossing or stamping a pattern into the surface. The pattern can be applied following sintering of a topcoat or application of a film. Alternatively, the pattern can be applied prior to sintering. In a further example, a surface including randomly embedded particles can be pressed into the cooking surface to form nucleation structures.

In a further embodiment, a cooking film can be formed using the above described method by replacing the reinforcement layer with a carrier. The film is formed on the carrier and subsequently separated from the carrier to provide the film with the cooking surface having nucleation structures. The film can be laminated to a different carrier to form a strong, reinforced material. A cooking belt can be formed using the above described method followed by coupling ends of the sheet material to form a closed loop belt in which the outer surface of the belt has nucleation structures. In another embodiment, the cooking sheet can be applied as a cover on a conveyor belt or a liner of a cooking container. In an additional example, cooking surface with nucleation structures can be applied by spray coating the layer.

In particular, the sheet material, the cooking film, or the conveyor belt is formed of materials and structures suitable for use in cooking applications, and are not formed of materials that are not accepted for at least cooking applications by the United States Food of America and Drug Administration. In an example, the conveyor belt or film can be used in commercial cooking services. For example, the conveyor belt or film can be used in meat cooking processes, such as to cook bacon, chicken, mixed meat products, or any combination thereof. In another example, a film can be placed into a vessel used to boil water. In general, the sheet material, cooking sheet, or film can be used to form a non-stick cooking surface with low splatter characteristics.

Particular embodiments of the sheet material exhibit desirable technical advantages. In particular, the cooking sheets have an extended durability and resistance to tear. In particular, the coated sheets are resistant to creasing, wicking of grease and charring. As described below, testing has shown durability under strenuous conditions with desirable cooking performance. As such, the cooking sheets provide a durable film that maintains food quality.

In particular, Applicants discovered that materials exhibiting non-stick properties also can increase splatter. Further, Applicants discovered sheet materials that limit splatter without loss of the non-stick properties.

EXAMPLES

Testing Methods

GREASE BAKE TEST: Samples are layered with hamburger grease and wrapped in aluminum foil. The assembly is baked at 400° F. for a period of at least one week. Samples are observed for integrity, wicking, and char inside the sheet.

Figure 10:
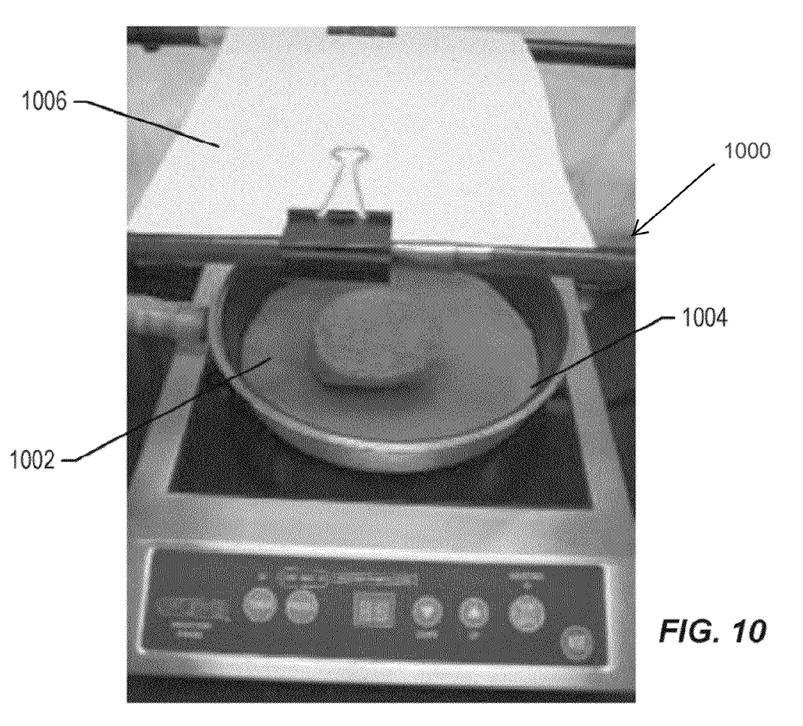
FIG. 10 includes an illustration of a splatter test configuration.
Figure 11:
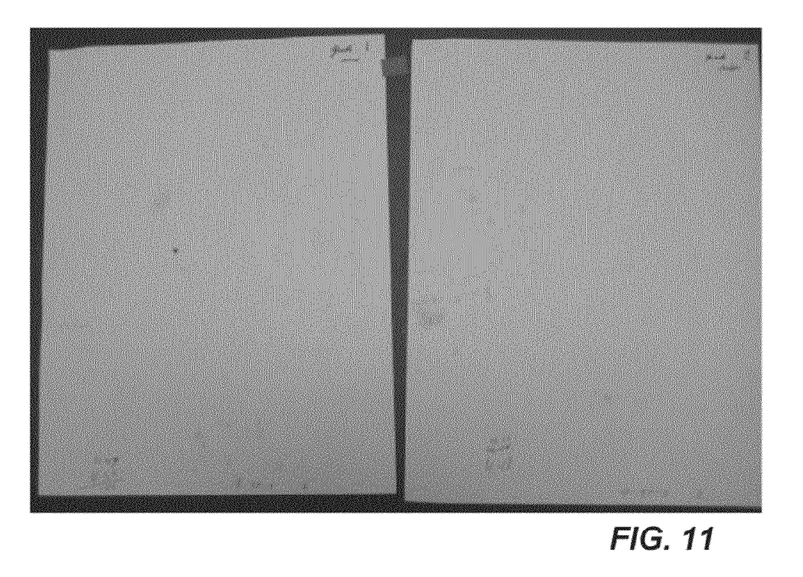
FIG. 11 and FIG. 12 include illustrations of exemplary test sheets exhibiting ratings 1-4.
Figure 12:
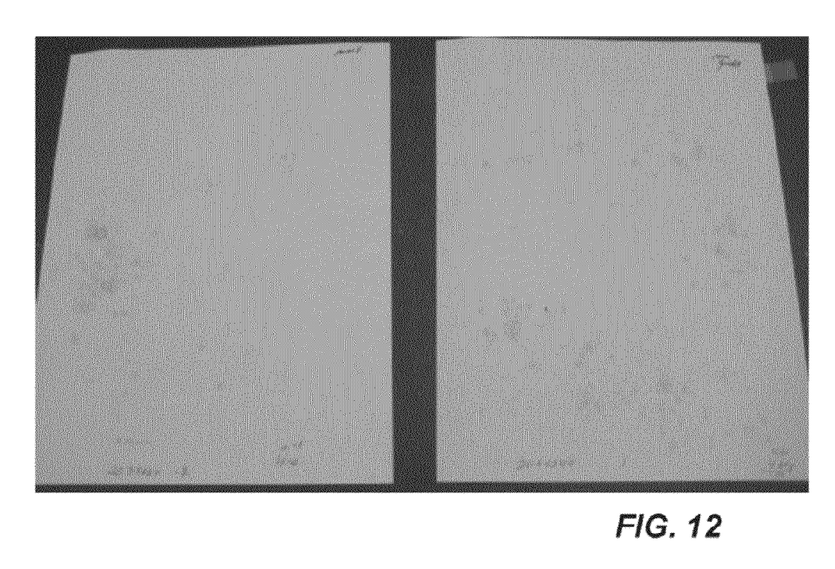

SPLATTER TEST: The amount of grease projected at least 4 inches from the cooking surface is qualitatively measured. An apparatus 1000 illustrated in FIG. 10 is used to determine splatter. A sheet material 1002 is placed on a grill surface 1004. Paper 1006 is placed 4 inches above the grill surface where meat patties are cooked. The tests are performed with meat patties weighing approximately 115 grams. Scoring is performed by visually comparing the overall grease collected relative to standards and averaging the results of 3 iterations. To determine the Splatter Score, the sheets are graded from 0 to 5 relative to a set of standards per height. As scored, zero means no splatter, 1=very little splatter, not enough to harm a person; 2=slight splatter; and at 5 the splatter is low and unlikely to hit someone beyond the hands. FIG. 11 illustrates example paper sheets exhibiting a rating of 1 (left) and 2 (right). FIG. 12 illustrates example paper sheets exhibiting a rating of 3 (left) and 4 (right). Samples are also observed for wicking.

SPLATTER HEIGHT TEST: Splatter is observed at a restaurant. During cooking of meat patties, splatter is visually observed and the number and maximum height of the splatter is determined. Two sets of meat patties are evaluated.

CREASE TEST: The crease tensile strength and crease trapezoidal tear strength can be measured after creasing a sample one time with a 10 lb roller applied parallel to a fold.

The tensile strength of the material after creasing with the 10 lb roller is denoted as the crease tensile strength and is measured in accordance with ASTM D902, and the trapezoidal tear strength after creasing is denoted the crease trapezoidal tear strength and is measured in accordance with ASTM D751, as modified by ASTM D4969.

Example 1

Samples are prepared in a tower oven using a 1080 glass fabric coated with different amounts of PTFE deposited as a topcoat by varying the meter # of the bars applying the resin. The bars are varied to vary the deposited layer from 0.30 mils to 0.80 mils in samples. The thickness of the final PTFE layer is changed for the samples and is reported as thickness pickup. The two separate runs are made to duplicate and confirm the results.

Figure 13:
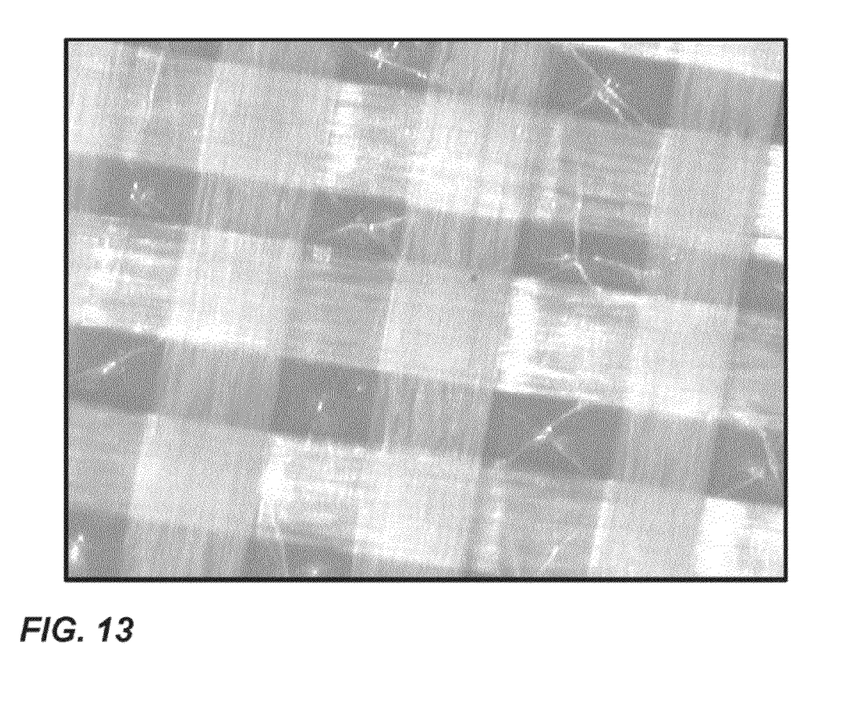
FIG. 13, FIG. 14, and FIG. 15 include illustrations of exemplary sheet material surfaces.

Table 1 illustrates the performance of the samples. The number of cracks is the number of cracks in the row of 4 windows and over the 4 adjacent yarns, an area of approximately 0.01"×0.066," as illustrated in FIG. 13. FIG. 13 includes an illustration of a sheet material exhibiting cracks in the windows between glass yarns.

TABLE 1

Crack Formation in PTFE Coating

| | Samples | | | | | | | | |
|---|---|---|---|---|---|---|---|---|---|
| | 1 | 2 | 3 | 4 | 5 | 6 | 7 | 8 | 9 |
| Thickness (mils) | 3.8 | 3.9 | 3.4 | 3.2 | 3.1 | 3.0 | 3.7 | 4.0 | 3.6 |
| Weight (osy) | 5.3 | 5.5 | 4.8 | 4.6 | 4.3 | 3.9 | 5.2 | 5.3 | 5.1 |
| Splatter Score | 1.3 | 1 | 1.2 | 1 | 1.7 | 1.3 | 2.0 | 1.7 | 1.0 |
| Splatter Height, max inch | none | 4" | none | none | None | 3" | none | 2" | None |
| Cracks | 8 | 7 | 7 | 10 | 7 | none | 11 | 8 | 11 |
| Grease Bake Test | | Pass | Pass | Pass | | | | | Pass |
| Tough | | Yes | Yes | Yes | | | | | Yes |
| Char Yarns | | No | No | No | | | | | No |
| Edge Wick | | No | No | No | | | | | No |
| Thickness Pick-up (mils) | 0.6 | 0.65 | 0.4 | 0.4 | 0.35 | 0.3 | 0.65 | 0.8 | — |

The Grease Bake Test indicates that the sheets are resistant to hot grease for a week. The baked sheets are tough and strong. There is no char in the yarns, and the surface cleaned easily and looked almost new when it was cleaned. Little wicking is observed from the top surface, none to the yarns, and little wicking is observed from the side edges.

The number of cracks is the number of cracks in the row of 4 windows and over the 4 adjacent yarns, an area of approximately 0.01"×0.066," as illustrated in FIG. 13. Most of the samples exhibit a Splatter Height of none or less than 3 inches high. In particular, the grease water mix is observed to foam and not form splatter. Such foam is a desirable result as splatter is very, very low and will not injure or burn a cook.

Regarding cracking, at around 0.3 mils, there is not enough dispersion passed to cause cracking. Above 0.35 mils, between 7 and 11 cracks form for each of the samples.

Example 2

Polymethylmethacrylate (PMMA) is chosen as a filler because it decomposes cleanly and is commonly used for food applications.

Sample 10 is formed to have the structure 1080 glass fabric/a layer of PTFE/and a layer of the 5.8% PMMA in PTFE. Sample 11 includes two passes of PTFE on the 1080 glass fabric and a hand dipped coating of PTFE dispersion at a specific gravity of 1.27 and 2% PMMA. Sample 12 is similar to Sample 11 with the exception that the dispersion of Sample 11 is diluted to a viscosity of 85 cps, PTFE solids of 33%, and approximate specific gravity of 1.25. The weight of PMMA on a dry basis is 5.8%. Table 2 illustrates the performance of the samples.

TABLE 2

Performance of Samples Including Voids

| | 10 | 11 | 12 |
|---|---|---|---|
| Thickness (mils) | 3.1 | 2.7 | 2.8 |
| Weight (osy) | 4.1 | | |
| Splatter Score | 0.3 | 1.3 | 2.0 |
| Splatter Height, max, inch. | None | none | 3" |
| Grease Bake Test | Pass | | |
| Tough | yes | — | Yes |
| Char | no | — | no |
| Wick | no | — | Slight |
| Surf. Rough (μinch) | 69 | | |
| Coat Adh, lbs | 4.9 | | |
| Trap Tear, lbs W | 3.2 | | |
| Tensile Str, lbs W | 80 | | |

Figure 14:
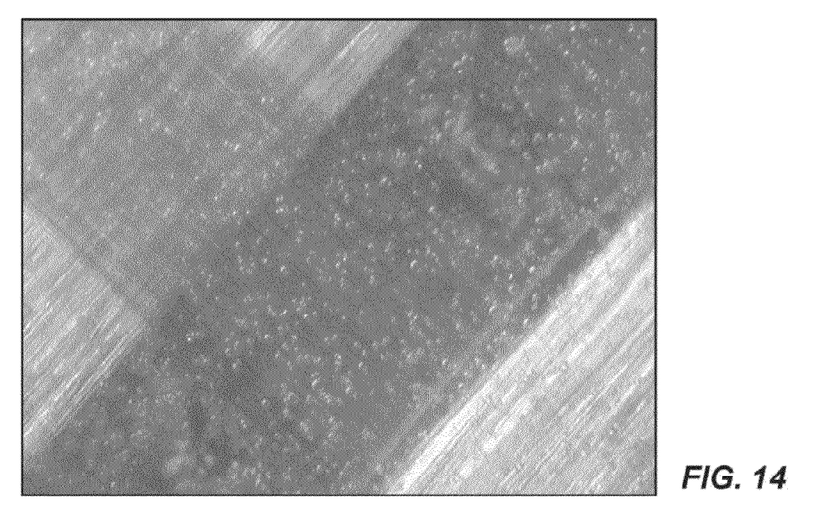

As illustrated in FIG. 14, the PMMA leaves holes in the top surface. As illustrated, there are many thousands of nucleation points per square inch. The PMMA is fugitive during the sintering step at 700° F. and leaves no visual residue in the clear polymer. IR spectra indicate that there is no PMMA in the samples.

Samples 10, 11 and 12 exhibit low splatter, with little splattering occurring during the Splatter Height test. The splatter score is as low as 0.3; meaning that 2 of 3 runs have no splatter at all.

The Grease Bake Test indicates that Samples 10 and 12 are resistant to hot grease for a week. The Samples are tough and strong, and there is no char in the yarns. The surfaces clean easily and looked almost new when cleaned. There is no wicking observed from the top surface and little wicking is observed from the side edges.

Example 3

Figure 15:
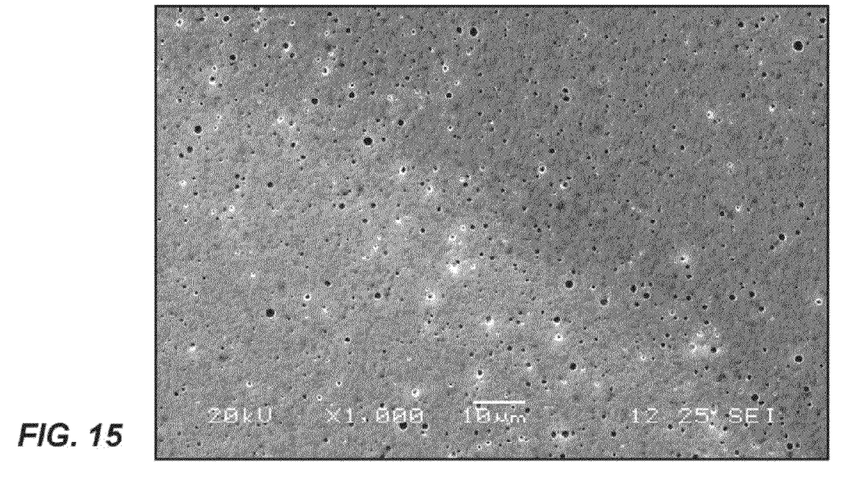

Samples are prepared by coating a dispersion of PTFE and 20 wt % silicone based on the solids content over a 1080 glass fabric. The samples include one of several commercially available silicones. FIG. 15 illustrates surface nucleation structures that form in the coating. Table 3 indicates the thickness, type of silicone, and performance of the samples.

TABLE 3

Performance of Samples Including Silicone Blend

| | 13 | 14 | 15 | 16 | 17 |
|---|---|---|---|---|---|
| Silicone | Wacker CT27E | Dow Corning additive 84 | Dow Corning additive 84 | Shin Etsu | DC2-1266 |
| Thickness (mils) | Too thick | 2.8 | 4.2 | 3 | 2.75 |
| Weight (osy) | | | 3.2 | | 2.1 |
| Splatter Score | 0 | 3.0 | | 3.7 | |

Sample 13 exhibits no splatter. Sample 14 and Sample 16 had splatter scores of 3.0 and 3.7, which are high relative to other samples, but the splatter is still lower than a cook's hands, resulting in little splatter to the cooks' hands. The DC2-1266 is rated for use with food by the United States of America Food and Drug Administration.

Example 4

Samples having the structure 1080 glass fabric and a PTFE layer are embossed by applying 120 grit sandpaper to 1 of 2 adjacent rollers on a machine with a nip. The rollers are pushed together with light pneumatic force on 2 small cylinders. The air pressure is varied from 10 to 20 to 30 psig; the calculated force is 3.5, 7, and 10.5 pli. The two higher pressures caused the sandpaper to puncture into the glass fabric such that a wicking dye wicked extensively into the fabric. The sample (#18) that was not punctured had a 6" high splatter. Table 4 illustrates performance of the samples.

TABLE 4

Performance of Embossed Samples

|  | 18 | 19 | 20 |
|---|---|---|---|
| Pressure, psig | 10 | 20 | 30 |
| Thickness (mils) | 2.5 | 2.5 | 2.5 |
| Weight (osy) | 3.6 | 3.6 | 3.6 |
| Splatter Score | 2 | 2.7 | 3.7 |
| Splatter Height, max, inch. | 6" | | |
| wick test | | fail | Fail punctured the fabric |

Example 5

Samples are formed with the glass/PTFE structure of Example 4 with the exception that the topcoat dispersion includes an additive to form protrusions. The additive includes one of silica; round glass beads; or NaAlSiOx, which is roughly spherical but has many edges. The beads and NaAlSiOx are 5-12 microns in size. Splatter Score and Splatter Height are acceptable.

TABLE 5

Samples having Protrusions

|  | 21 | 22 | 23 | 24 |
|---|---|---|---|---|
| Additive | Silica | Glass Beads | Glass Beads | NaAlSiOx |
| Splatter Score | 1 | 1.7 | 2.3 | 1.7 |
| Splatter Height (in) | 3 | 3 | 3 | 6 |
| Grease Bake Test | | | | |
| Tough | Yes | Yes | Yes | yes |
| Char | No | No | No | no |
| Wick | Slight | Slight | Slight | slight |

Example 6

The above samples are observed for nucleation structure density. As illustrated in Table 6, each of the methods provided nucleation structures at a density of at least 5000 per square inch. In addition, each of the structures mitigated splatter.

TABLE 6

Density of Nucleation Structures for Exemplary Sheet Materials

| | Nucleation Structure Density (count/sqin.) | Nucleation Structure Type | Splatter Observation |
|---|---|---|---|
| Silicone Blend Topcoat | ~70 million | Voids | Foam |
| Fugitive Component (PMMA) | ~42,000 | Voids | Foam |
| Self-induced Cracking | ~6,000 | Cracks | Foam |
| Embossing | ~62,000 | Indentations | Some Splatter |
| Raised Inclusions | ~42,000 | Protrusions | Foam |

Example 7

Sample release sheets are evaluated for splatter generated by cooking strips of bacon next to each other and laying in grease. During cooking the splatter test is used to characterize the amount of splattered grease by each of several release sheets in comparison to that of bacon cooked on an uncoated steel surface. Bacon can stick to the bare grill, but does not stick to the release sheet. Table 7 illustrates that less splatter is observed when a release sheet is used than when no release sheet is used.

TABLE 7

Splatter of Bacon Grease on Release Sheets

| Sheet | Description | Splatter Score | Observations |
|---|---|---|---|
| Comp. 1 | Flat release sheet | 2.3 | Many bubbles, some splatter |
| Bare Grill | No release sheet | 3.0 | Lot of visible splatter |
| Comp. 2 | Flat release sheet | 1.0 | |
| Sample 25 | Fugitive component | 0.7 | Foams |
| Sample 26 | Fugitive component | 1.0 | Foams |
| Sample 27 | Fissures | 1.7 | foams |

Example 8

Sample release sheets are evaluated for splatter generated by cooking sausage patties. During cooking the splatter test is used to characterize the amount of splattered grease by each of several release sheets in comparison to that of sausage cooked on an uncoated steel surface.

TABLE 8

Splatter of Sausage Grease on Release Sheets

| Sheet | Description | Splatter Score | Observations |
|---|---|---|---|
| Sample 27 | Fissures | 0.0 | Sausage does not stick. |
| Sample 25 | Fugitive filler | 0.0 | Sausage does not stick. |
| Comp. 1 | Flat release surface | 0.0 | Sausage does not stick. |
| Bare grill | No release sheet | 0.0 | Sausage sticks to surface |

In a first aspect, a cooking release material includes a layer including fluoropolymer. The cooking release material has a major surface having nucleation structures in a nucleation structure density of at least 10 per square inch. In an example of the first aspect, the cooking release material is in the form of a cooking sheet or a belt.

In a further example of the first aspect, the nucleation structure comprises a fracture. In another example, the nucleation structure comprises a void, a hole, or an indentation.

In an additional example of the first aspect, the cooking release material is rated as at least food grade as defined by the United States of America Food and Drug Administration.

In an example, the nucleation structure has a characteristic dimension of not greater than 50 micrometers, such as not greater than 10 micrometer. In another example, the nucleation structure density is at least 1000 per square inch, such as at least 5000 per square inch, at least 10000 per square inch, at least 25000 per square inch, or even at least 50000 per square inch.

In a further example, the fluoropolymer comprises a perfluoropolymer. The perfluoropolymer can be polytetrafluoroethylene (PTFE), fluorinated ethylene propylene (FEP), perfluoroalkoxy (PFA), or any combination thereof. For example, the perfluoropolymer is polytetrafluoroethylene (PTFE).

In an additional example, the cooking release material further includes a surface layer comprising a perfluoropolymer and forming the major surface of the cooking release material. The surface layer includes the nucleation structures. In an example, the surface layer includes a blend of perfluoropolymer and at least food grade silicone.

In an example, the cooking release material further includes a reinforcement material, the layer coated over the reinforcement material. The reinforcement material can include a fibrous material. The fibrous material can include woven fabric. The woven fabric can include fiberglass.

In another example, the cooking release material exhibits a Splatter Score of not greater than 3, such as not greater than 2.

In a second aspect, a cooking sheet includes a woven fabric comprising fiberglass, a first coating disposed on the woven fabric and including a perfluoropolymer, and a surface coating overlying the first coating and forming a major surface of the cooking sheet. The surface coating includes nucleation structures at a nucleation structure density of at least 10 per square inch. The cooking sheet has a thickness of not greater than 5 mils.

In an example of the second aspect, the perfluoropolymer is polytetrafluoroethylene (PTFE), fluorinated ethylene propylene (FEP), perfluoroalkoxy (PFA), or any combination thereof. For example, the perfluoropolymer is polytetrafluoroethylene (PTFE).

In another example of the second aspect, the surface coating includes the perfluoropolymer. In a further example, the surface coating comprises silicone. In a additional example, the surface coating comprises a blend of perfluoropolymer and silicone.

In an example, the nucleation structure density is at least 1000 per square inch. The thickness can be not greater than 4 mils. The nucleation structures can have a characteristic dimension of not greater than 50 micrometers.

In a third aspect, a method of forming a cooking release material includes applying a first coating of perfluoropolymer to a reinforcement material, applying a surface coating to form a major surface, and forming nucleation structures in the surface coating at a density of at least 10 per square inch.

In an example of the third aspect, the surface coating includes a fugitive material, wherein forming the nucleation structures includes releasing the fugitive material to form voids. In another example, the surface coating includes perfluoropolymer and has a thickness greater than 0.35 mils. Forming the nucleation structures can include sintering the surface coating to form fractures. In a further example, forming the nucleation structures includes embossing the surface coating.

In another example, the surface coating includes a blend of perfluoropolymer and silicone. Forming the nucleation structures includes sintering the surface coating to form voids. In an additional example, forming the nucleation structures includes patterning the surface coating.

In a further example, applying the first coating includes contacting the reinforcement material with a dispersion including the perfluoropolymer and fusing the perfluoropolymer.

In an example, applying the surface coating includes contacting the reinforcement material coated with the first coating with a dispersion comprising the perfluoropolymer and fusing the perfluoropolymer. In an additional example, applying the surface coating includes contacting the reinforcement material coated with the first coating with a dispersion comprising the perfluoropolymer and a silicone and fusing the perfluoropolymer. In another example, applying the surface coating includes spray-coating to form the surface coating.

In a fourth aspect, a cooking device includes a cooking release material including fluoropolymer. The cooking release material defines a cooking surface of the cooking device. The cooking surface includes nucleation structures in a nucleation structure density of at least 10 per square inch. In an example of the fourth aspect, the cooking release material is disposed on a substrate to be heated.

In a fifth aspect, a cooking belt includes a cooking release material including a reinforcement material and a fluoropolymer layer disposed on the cooking release material. The cooking release material defines a major surface including nucleation structures in a nucleation structure density of at least 10 per square inch. The cooking release material forms a closed loop. In an example of the fifth aspect, the cooking belt further includes a clasp to secure first and second ends of the cooking release material to form the closed loop.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of cooking a meat product, comprising:
   providing a cooking release material including a reinforcement material and a fluoropolymer layer disposed on the reinforcement material, the cooking release material defining a major surface comprising nucleation structures that promote evaporation or initiate small bubbles, leading to boiling with smaller bubbles, wherein the nucleation structures are present in a nucleation structure density of at least 10 per square inch;
   providing a meat product; and
   cooking the meat product on the cooking release material.

2. The method according to claim 1, further comprising disposing the cooking release material over a cooking surface of a grill platen such that the major surface comprising nucleation structures faces away from the grill platen.

3. The method according to claim 2, providing an additional cooking release material and disposing the additional cooking release material over a cooking surface of an additional grill platen.

4. The method according to claim 3, wherein the meat product has opposing first and second major surfaces, the method further comprising disposing the meat product between the grill platens and bringing the grill platens together to heat the first and second major surfaces of the meat product.

5. The method according to claim 1, wherein the cooking release material is a cooking belt wrapped around rollers to form a closed loop, the method comprising routing the cooking belt around the rollers.

6. The method according to claim 1, wherein the nucleation structures comprise fractures.

7. The method according to claim 1, wherein the nucleation structures comprise voids.

8. The method according to claim 1, wherein the nucleation structures have a characteristic dimension of not greater than 50 micrometers.

9. The method according to claim 1, wherein the nucleation structure density is at least 1000 per square inch.

10. The method according to claim 1, wherein the fluoropolymer comprises a perfluoropolymer.

11. The method according to claim 10, wherein the perfluoropolymer comprises polytetrafluoroethylene (PTFE), fluorinated ethylene propylene (FEP), perfluoroalkoxy (PFA), or any combination thereof.

12. The method according to claim 1, wherein the cooking release material has a thickness of not greater than 5 mils.

13. The method according to claim 1, wherein the cooking release material further comprises a surface layer comprising a perfluoropolymer, the surface layer forming the major surface layer comprising the nucleation structures.

14. The method according to claim 1, wherein the cooking release material further comprises a surface layer comprising a blend of perfluoropolymer and at least food grade silicone, the surface layer forming the major surface comprising the nucleation structures.

15. A method of cooking a meat product, comprising:
   providing a cooking release material including a reinforcement material and a fluoropolymer layer disposed on the reinforcement material, the cooking release material having a major surface having nucleation structures that promote evaporation or initiate small bubbles, leading to boiling with smaller bubbles, wherein the nucleation structures are present in a nucleation structure density of at least 10 per square inch;
   providing a meat product; and
   cooking the meat product on the cooking release material, wherein the cooking release material exhibits a Splatter Score of not greater than 3 wherein the Splatter Score is determined based on the overall amount of grease projected at least 4 inches from a cooking surface of the cooking release material to a paper placed 4 inches above a grill surface when the cooking release material is placed on the grill surface and used to cook meat patties weighing approximately 115 grams wherein the overall amount of grease is an average of 3 iterations of testing.

16. The method according to claim 15, wherein the Splatter Score is not greater than 2.

17. The method according to claim 15, wherein the cooking release material has a Splatter Height of no greater than 6 inches.

18. A method of cooking a meat product, comprising:
   providing a cooking release material including a reinforcement material and a fluoropolymer layer disposed on the reinforcement material, the cooking release material having a major surface having nucleation structures that promote evaporation or initiate small bubbles, leading to boiling with smaller bubbles, wherein the nucleation structures are present in a nucleation structure density of at least 10 per square inch;
   providing a meat product; and
   cooking the meat product on the cooking release material, wherein the cooking release material passes the Grease Bake Test wherein samples of the cooking release material are layered with hamburger grease, wrapped in aluminum foil, and baked at 400° F. for a period of at least one week and observed for integrity, wicking, and char.

* * * * *